United States Patent [19]

Amada et al.

[11] Patent Number: 5,241,543
[45] Date of Patent: Aug. 31, 1993

[54] INDEPENDENT CLOCKING LOCAL AREA NETWORK AND NODES USED FOR THE SAME

[75] Inventors: Eiichi Amada, Tokyo; Kunio Hiyama, Fujisawa; Naoya Kobayashi, Hachioji; Yoshihiro Takiyasu, Higashimurayama; Yasuhiko Hatekeyama, Hadano; Haruyuki Nakayama, Ebina, all of Japan

[73] Assignee: Hitachi, Ltd., Tokyo, Japan

[21] Appl. No.: 672,640

[22] Filed: Mar. 20, 1991

Related U.S. Application Data

[63] Continuation-in-part of Ser. No. 399,901, Aug. 29, 1989, Pat. No. 5,103,447.

[30] Foreign Application Priority Data

Jan. 25, 1989 [JP] Japan .................................. 1-013910
Mar. 22, 1990 [JP] Japan .................................. 2-069779

[51] Int. Cl.⁵ .............................................. H04L 7/00
[52] U.S. Cl. .................................. 370/100.1; 370/102; 370/85.15
[58] Field of Search ..................... 370/100.1, 102, 105, 370/105.1, 105.2, 105.3, 105.4, 106, 85.15, 85.12, 85.5; 375/107, 114, 116, 118, 120

[56] References Cited

U.S. PATENT DOCUMENTS

| | | | |
|---|---|---|---|
| 4,569,041 | 2/1986 | Takeuchi et al. | 370/85.15 |
| 4,791,652 | 12/1988 | McEachern et al. | 370/102 |
| 4,811,340 | 3/1989 | McEachern et al. | 370/102 |
| 4,858,232 | 8/1989 | Diaz et al. | 370/85.15 |

FOREIGN PATENT DOCUMENTS 6144426 7/1981 Japan .

Primary Examiner—Douglas W. Olms
Assistant Examiner—Hassan Kizou
Attorney, Agent, or Firm—Antonelli Terry Stout & Kraus

[57] ABSTRACT

In a local area network composed of transmission lines for interconnecting a plurality of subordinate networks including synchronous apparatuses and a plurality of nodes which connect the subordinate networks to the transmission lines, information is transferred using a fixed length frame, a clock source which generates an independent clock signal and a circuit which generates a fixed length frame with the oscillation frequency of the clock source as a reference are provided in each node so as to adopt an independent clocking system, and distribution of a common synchronizing clock required for synchronous apparatuses is made by transmission while embedding transition point information of a synchronizing clock in a specific space in the fixed length frame. Further, each node generates a fixed length transmission frame with an independent clock signal, and on the other hand, there are provided in each node, from the requirement that information quantity applied to a network is made constant, a circuit for extracting a received clock, a storage device for storing received information temporarily, and an information outgoing quantity control circuit in which information quantity which is sent out in one frame is increased when the information quantity stored in the storage device becomes more than a predetermined first reference value and information quantity which is sent out in one frame is decreased when the information quantity stored in the storage device becomes less than a predetermined second reference value.

18 Claims, 10 Drawing Sheets

INDEPENDENT CLOCKING LOCAL AREA NETWORK AND NODES USED FOR THE SAME

CROSS-REFERENCE TO RELATED APPLICATION

This is a continuation-in-part of copending U.S. application Ser. No. 07/399,901, filed Aug. 29, 1989 which issued as U.S. Pat. No. 5,103,447.

BACKGROUND OF THE INVENTION

The present invention relates to an architecture of an independent clocking local area network (LAN), i.e., a local area network (hereinafter abbreviated as a LAN) in which each node has an independent clock source of a clock signal and an information signal is sent out using an oscillated clock signal, and more particularly, to an architecture of a multimedia LAN in which any data transfer error due to jitter accumulation is not generated even when the quantity of connected nodes is increased.

In a LAN, a plurality of node devices (hereinafter simply referred to as nodes) are connected with one another with a single transmission line and high speed information transmission and switching function are realized efficiently in a limited service area, and variety types of LANs have been put to practical use. A ring type LAN having a transmission line in a ring form and a bus type LAN using a transmission line in a bus form are typical. In such a LAN construction, a synchronous system becomes an issue. Ideally, it is preferable that all the nodes constituting a LAN are operated with a same clock signal (hereinafter simply referred to as a clock). In case all the nodes are in operation with the same clock, the rate of sending information and the rate of receiving information are equal to each other. Therefore, transmission and reception of information become possible without providing a buffer therebetween. As such a LAN in which all the nodes are operated with the same clock, the standard IEEE 802.5 ("Token ring") (a document ANSI/IEEE Std 802.5-1985 ISO/DP 8802/5 "LOCAL AREA NETWORKS Token Ring Access Method") is a typical well-known example. In respective nodes in a LAN of above-mentioned standard IEEE 802.5, clock components included in a received signal from a previous (transmission) node are regenerated by means of a phase lock loop (PLL), regenerated clock is supplied into a receiving node, and further, information is sent out to a next node by abovementioned regenerated clock (master-slave synchronization). The clock for synchronization is repeated at respective nodes as described above, makes a round in the ring, and the whole system becomes to be operated synchronously with a synchronous clock generated by a master node. Since the clock is regenerated and repeated in respective nodes, however, the jitter generated at the time of regeneration and transfer of the clock is accumulated. Since received data are regenerated by the clock having such jitter, such a problem arises that received data are not regenerated correctly when the jitter becomes larger. The quality of connectable nodes is limited in many cases in point of operation by such jitter accumulation.

In order to avoid jitter accumulation, there is an (independent synchronizing) system in which regeneration and transfer of the clock is not performed, each of respective nodes has an independent clock source, respectively, and an information signal is sent out using an oscillated clock. For example, this system is described in detail in the standard FDDI-I (a document ISO/IEC JTC1 SC13 N477; Draft for ISO 9314-1: Fiber Distributed Data Interface (FDDI) Token Ring Physical Layer Protocol (PHY)).

In FDDI-I, however, the information signal transmitted in the LAN is asynchronous information, viz., only the information which is not required to be sent periodically, and the information is transmitted and received with a frame for sending information (hereinafter referred to as a frame) (4,500 bytes maximum) as a unit. A blank of 8 bytes and more is put between mutual frames, and the difference in clock frequencies between nodes is absorbed by increasing and decreasing the size of the blank portion. Thus, it is possible for respective nodes to conduct communication without giving rise to overflow or underflow by regenerating and repeating data only.

The above-mentioned independent clocking system is a system which is applicable only to a LAN which supports asynchronous data only. Recently, however, demand for a high speed LAN called a multimedia backbone LAN which is able to transmit and switch not only asynchronous data, but also synchronous information is increasing. (Information, voice and data which are required to transmit a predetermined quantity periodically are typical examples. These may be handled as asynchronous information, but buffering processing and the like are required to guarantee periodicity at transmit-receive terminals, causing handling to become complicated.) Such a multimedia backbone LAN accommodates a low speed, asynchronous-data-dedicated LAN such as the standard IEEE 802.3, 802.4 and 802.5 and FDDI-I which is a high speed LAN so as to realize information transmission and switching function among LANs, and also supports information transfer among synchronous apparatuses such as a PBX (private branch exchange) and a TDM (time division multiplexer) so as to realize an integrated private network. Existing synchronous apparatuses are designed on the premise that these apparatuses are operated with the same synchronizing clock when they are interconnected. Accordingly, in a network including such synchronous apparatuses it is required to supply a synchronizing clock to synchronous apparatuses from the network through nodes. Further, since it is required to transfer information periodically and at a same rate among synchronous apparatuses, it is preferable that an information quantity applied to respective nodes is made equal in the whole system. Thus, it is required to supply a synchronizing clock which is common to all nodes.

As a result, a master-slave synchronization system which is easy to be constructed has been heretofore employed for synchronization of the multimedia LAN. As a document related to such a technique, "A 1.2 Gbps optical loop LAN for wideband office communications" IEEE Global Telecommunications Conference 1985, 15-4, may be mentioned.

In the above-mentioned LAN of master-slave synchronization system, the synchronizing clock is distributed by the fact that the clock generated by a master node is regenerated and repeated by respective nodes. In this system, since all nodes are operated with a common synchronizing clock, it is easy to connect synchronous apparatuses with one another. Since jitter is accumulated as described previously, however, there is such a drawback that the number of connectable nodes is limited.

As another system for solving the jitter accumulation problem in the multimedia LAN, an independent clocking system in which respective nodes send out signals to a transmission line using clocks oscillated in respective stations is possible. In the multimedia LAN, however, it is necessary to devise how to include the synchronous apparatuses, unlike the synchronous-data-dedicated LAN. For example, it is being examined to employ an independent clocking system in the standard FDDI-II which is being standardized by the American National Standards Institute (ANSI) at present described in detail in a document: "FDDI Hybrid Ring Control, Draft proposed American Standard, Jan. 20, 1989". FIG. 15 shows a construction of a transfer frame (referred to as a cycle in FDDI-II) adopted in FDDI-II. The information is transferred while being embedded in a transfer frame of a fixed period. The frame is composed of a preamble, a cycle header and an information portion. The period of the frame is at 125 μs (⅛ KHz). Further, the information transmission rate is at 100 Mb/s, but information in 4 bits is sent out after converting into 5 bits (4B/5B code) for the purpose of removing DC frequency components on a transmission line and transmission of specific codes (for detection of frame boundary and control signals). Therefore, the physical transmission rate is at 125 Mb/s. The number of bits in the preamble space is different depending on oscillation frequency deviation of clocks of respective nodes, but the number of bits is adjusted so that the cycle period becomes 125 μs. The master node creates the frame period based on an external clock or an oscillation frequency of the own station. In each node, a synchronizing clock is extracted from a received signal using a PLL, a tank circuit and the like. It becomes possible to receive information in a frame by receiving the received signal correctly and detecting a synchronous pattern in the cycle header using the extracted clock.

In a proposal in the above-mentioned standard of FDDI-II, the oscillation frequency deviation of each node is adjusted by adjusting the length of the preamble portion between frames, and periodic data transfer is realized by introducing a frame construction.

It is required for a multimedia LAN to distribute the same synchronizing clock among synchronous apparatuses through the nodes in order to transmit not only asynchronous information, but also synchronous information as described previously. Accordingly, there is a problem as a synchronous system in both systems of the above-mentioned master-slave synchronization system and FDDI-II system of independent clocking. That is, restriction on the number of nodes due to jitter accumulation described previously becomes an issue in the master-slave synchronization system.

In the FDDI-II system, there are such problems as described hereunder.

A first problem is that the system is weak against a transmission error on the transmission line. In a high speed LAN, an optical fiber is used for transmission, but a bit error rate in optical transmission is usually around $10^{-9}$. Such a bit error generated at random or in a burst form should never be enlarged by the network. In the FDDI-II system, a starting point of each frame is recognized by detecting a specific bit pattern which does not exist in the information, and there is a possibility that an error of one frame portion is generated by the bit error at this portion. Further, the length of an outputted frame is determined by the length of a received frame in each node, and there is also a possibility that a frame recognition error of one node extends to a plurality of nodes.

A second problem exists in that a physical transmission rate becomes higher than a logical information transfer rate. This is caused by the fact that 4-bit information is transmitted after coding into a 5-bit transmission code because a specific bit pattern which does not appear in the information portion is used for frame recognition. In FDDI-II, the physical transmission rate is set at 125 Mb/s against the information transfer speed of 100 Mb/s, and only 80% of the transmission band is utilized for actual information transfer.

A third problem is that frame processing becomes complicated because a frame is of a variable length.

SUMMARY OF THE INVENTION

Thus, it is an object of the present invention to realize an independent local area network and nodes for a local area network which have solved above-mentioned problems, that is, which have little jitter accumulation and are able to distribute the synchronizing clock among synchronous apparatuses even when a frame having a fixed length is used.

In order to achieve the above-mentioned object, according to the present invention, there is provided a local area network composed of transmission lines for interconnecting a plurality of subordinate networks including synchronous apparatuses and a plurality of nodes which connect the above-mentioned subordinate networks to the transmission lines, wherein information is transferred using a fixed length frame, a clock source generating an independent clock signal in each node and means for forming a fixed length frame with the oscillation frequency of the clock source as a reference are provided whereby to adopt an independent clocking system, and distribution of a common synchronizing clock required for synchronous apparatuses is made in such a manner that transition point information of the synchronizing clock is embedded in a specific place in the fixed length frame in transmission. The above-mentioned transition point information means that reference points such as rising or falling edges of the clock provide timewise positional information during the period of a transmission frame having a fixed length formed by each of the above-mentioned nodes. Since each node has an independent clock, transition point information is varied with respect to each node because the period of a fixed length transmission frame formed by each node and the period of a common synchronizing clock are independent.

Further, from such requirements that each node produces a fixed length transmission frame with an independent clock signal, and on the other hand, the information quantity applied to a network is made constant, there are provided in each node, means of extracting a received clock, storage means for storing received information temporarily, and information outgoing quantity control means which increases information quantity which is sent out into one frame when the information quantity stored in the storage means becomes more than a predetermined first reference value and reduces the information quantity which is sent out into one frame when the information quantity stored in the storage means becomes less than a predetermined second reference value.

The common synchronizing clock is sent out from the master node as a preferable embodiment configuration. Further, NNI ("Network Node Interface for the Synchronous Digital Interface") standards which are specified by CCIT (International Telegraph and Telephone Consultative Committee) standards are applied to a physical layer. In particular, a SONET (Synchronous Optical Network) frame is used as the fixed length frame, and the transition point information on the common synchronizing clock is transferred by using a section overhead space of the SONET frame.

The clock frequency of each node is independent (independent clocking), and the rate of transmitted information is common in the whole system. Accordingly, a stuffing function of NNI standard is used for absorbing the difference between the node clock frequency and the information transmission rate in each node. The synchronizing clock is distributed by setting the overhead portion of NNI standard, viz., the synchronizing clock period to be distributed at almost the same frequency as the frame frequency, and by transferring transition point information of the synchronizing clock.

According to the present invention, the problem of data transmission error caused by clock jitter accumulation is solved by making the clock frequency in each node independent. Furthermore, connectability with public networks and appropriation of techniques become possible by applying NNI standards which are international standards to the physical layer. Further, frame synchronization is obtainable by using a fixed length frame even if a specific pattern for frame synchronization is not used. Namely, since a frame synchronous pattern appears periodically even if the same pattern as the pattern for frame synchronization is used in the information portion, it is possible to recognize a starting point of a frame by detecting periodicity. Thus, it is possible to make the physical transmission rate and the information transmission rate almost equal to each other. Further, independent synchronization can be realized using the stuffing function of NNI standard. Namely, in each node, the difference between a self-node clock and the information quantity from a previous node is monitored, and stuffing is performed in a direction of reducing the difference when the difference exceeds a specified threshold, whereby making it possible to make the information quantity applied to transmission lines constant while maintaining the clock frequency in each node independent. The information rate applied to the transmission line is specified by the master node. Furthermore, distribution of common synchronizing clocks required for synchronous apparatuses is made possible by transferring transition point information of the synchronizing clock using a control information transfer area (overhead space of NNI standard) in a frame. When the distributed synchronizing clock frequency is set close to a frame repeat frequency, the number of the synchronizing clock transition point in one frame is either one of 0, 1 or 2. Therefore, it is possible to distribute the synchronizing clock by preparing a space where information for two transition points can be transmitted in the control information area. Moreover, overflow and underflow of synchronous information in nodes are prevented by having the information quantity applied in a LAN synchronize with the synchronizing clock and supplying the synchronizing clock to the synchronous apparatuses.

DESCRIPTION OF THE PREFERRED EMBODIMENTS

Figure 1:
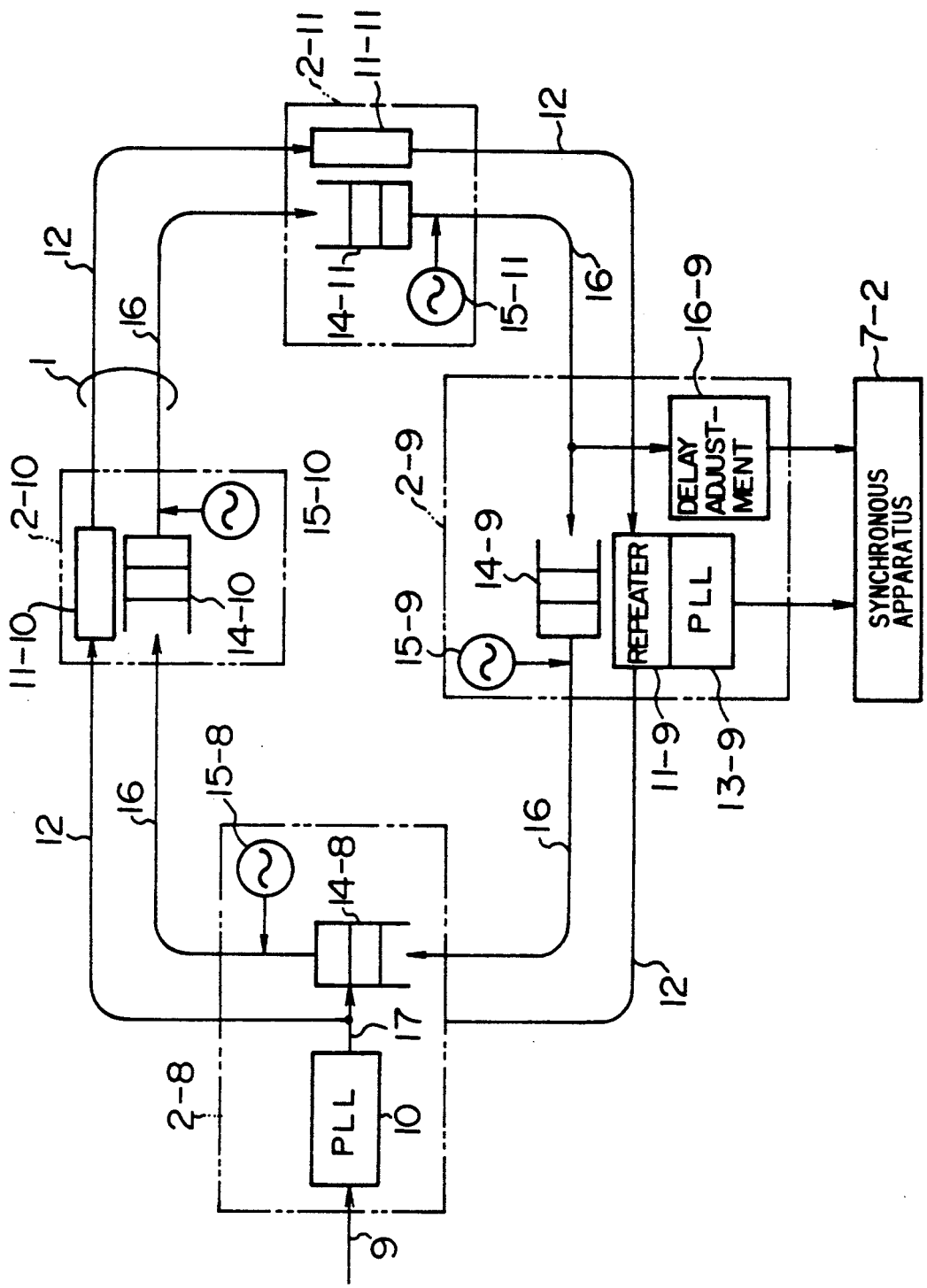
FIG. 1 is a block diagram showing an embodiment of an independent clocking LAN according to the present invention.
Figure 2:
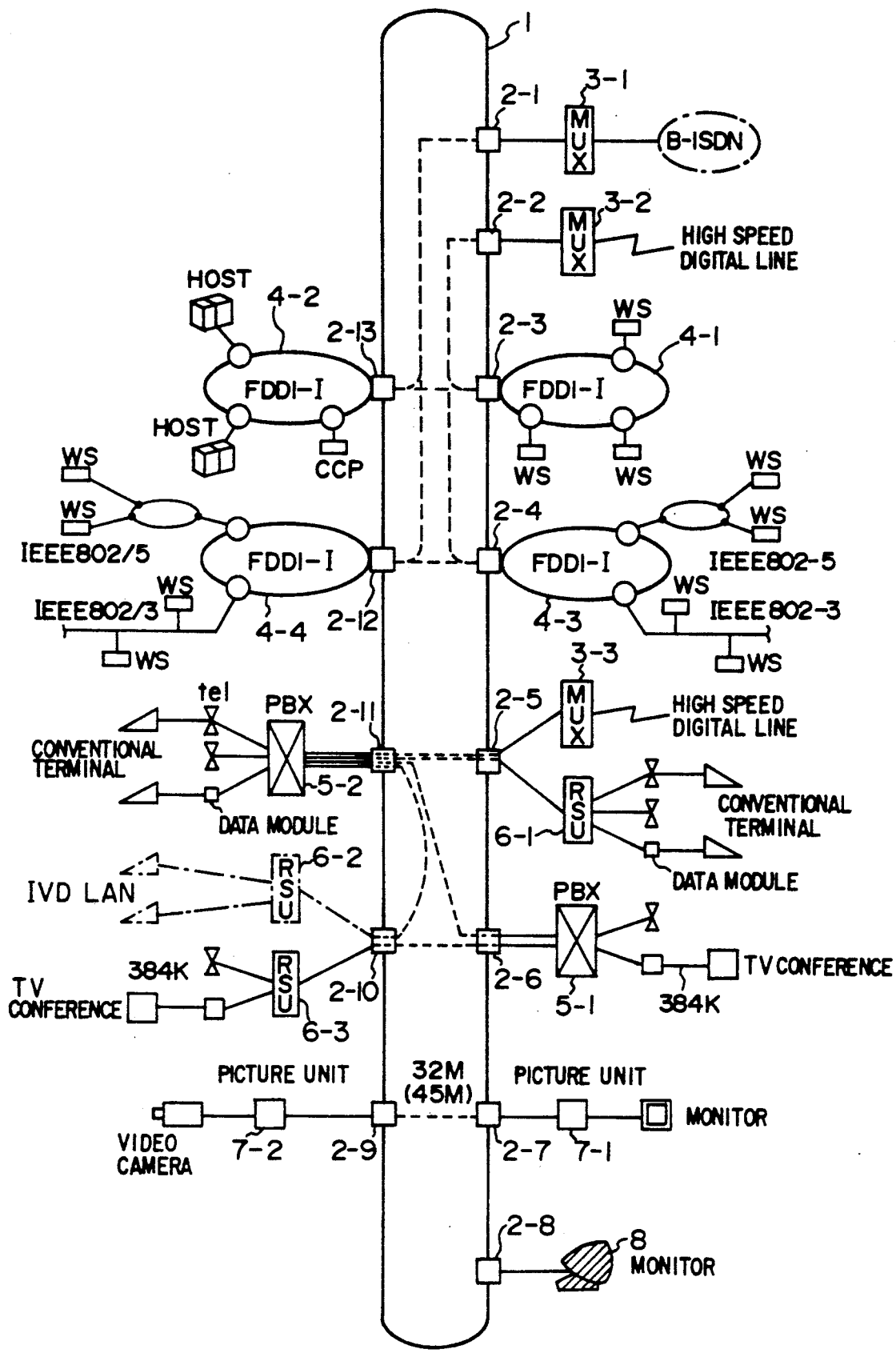
FIG. 2 is a diagram showing a utilization configuration of a multimedia LAN.

Both FIG. 1 and FIG. 2 show constructions of multimedia LANs in an embodiment of an independent clocking LAN according to the present invention. FIG. 1 shows a part of FIG. 2 in detail for the convenience of explanation. In a multimedia LAN shown in FIG. 2, nodes 2-1 to 2-13 are connected in a ring form in a transmission line 1. The transmission line 1 is an optical fiber, and the transmission rate is at 155.52 Mb/s. NNI standards of CCITT are adopted for the transmission rate of a physical layer and a frame format. Namely, the transmission rate is at 155.52 Mb/s. A frame format of NNI standard will be explained later with reference to FIG. 3. It is possible to connect either one of a synchronous apparatus and an asynchronous apparatus to a multimedia LAN. In FIG. 2, Private Branch Exchanges (PBXs) 5-1 and 5-2, remote units (RSU) 6-1, 6-2 and 6-3 of the PBXs, picture units 7-1 and 7-2, multiplexers (MUX) 3-1, 3-2 and 3-3 for communicating with remote locations through high speed digital lines are connected as synchronous apparatuses. These apparatuses are connected with one another through channels which guarantee periodical information transfer. On the other hand, FDDI-I 4-1, 4-2, 4-3 and 4-4 which are LANs are connected directly to the transmission line 1 through nodes 2-3, 2-13, 2-4 and 2-12 of the multimedia LAN as asynchronous apparatuses. Work stations (WS), computers (HOST, CCP) and the like are connected to FDDI-I 4-1, 4-2, 4-3 and 4-4 directly or through further subordinate low speed LANs such as IEEE 802.3, 802.5 and the like. It is also possible to include them directly in the nodes. It is a matter of course to employ a multiplexer used in common to synchronous and asynchronous apparatuses. In a multimedia LAN, a plurality of synchronous and asynchronous apparatuses are connected with one another in a high speed, thus realizing information transmission and switching among apparatuses.

Figure 3:
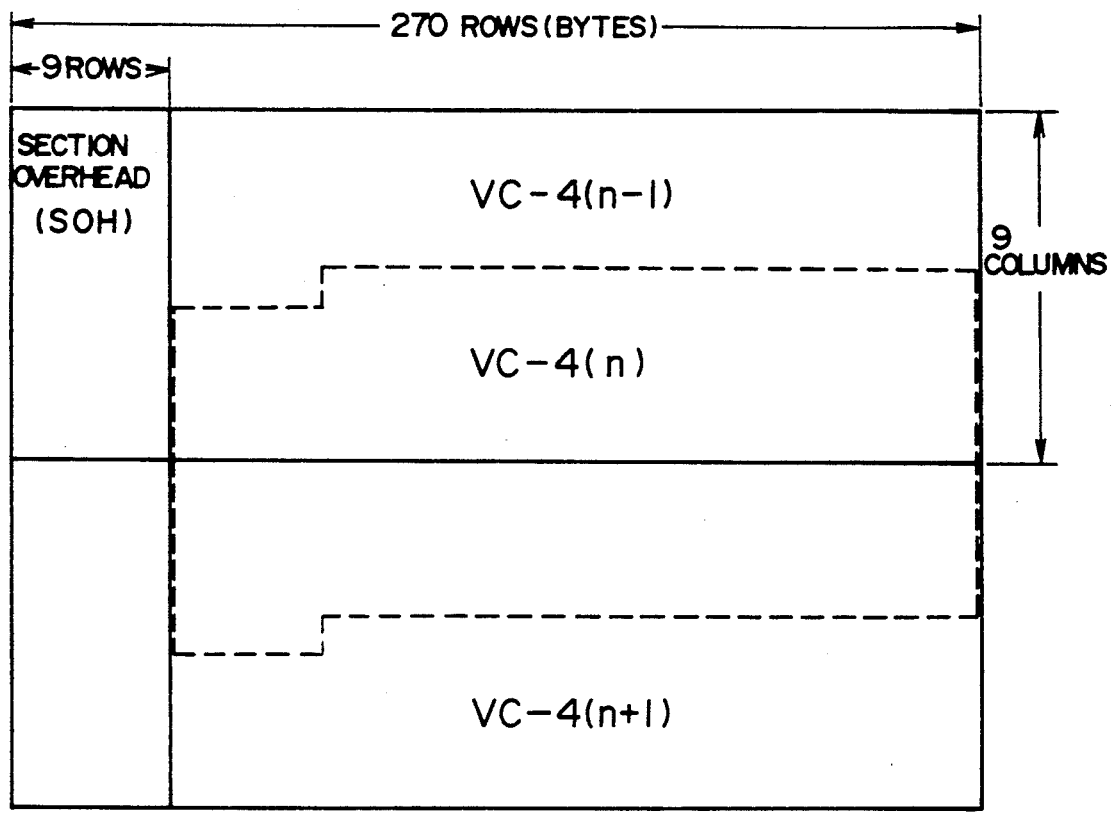
FIG. 3 is a frame construction diagram used in a LAN of the present invention.

FIG. 3 shows a construction of a frame transmitted in the LAN. The frame is the same as a SONET frame which meets the NNI standard and is composed of 270 rows and 9 columns, and 2,430 bytes (270×9) are transmitted in about every 125 μs (depending on an oscillation frequency of a node). Thus, the transmission frequency is at approximately 155.52 MHz. Among 270 rows in the frame, the first 9 rows form a section overhead (hereinafter abbreviated as SOH) space, and are used for control and control information transfer among the nodes. The remaining space is used for information transfer. In order to make an information transfer rate in a multimedia LAN independently of the frequency of the node clock, information is transmitted by using a transmission block of 2,349 (261×9) bytes which is called a virtual container 4 (hereinafter abbreviated as VC-4). The positional relationship between VC-4 and the frame is not necessarily fixed, but the positional relationship between them is varied in accordance with the difference between the node clock and the rate of information which is transferred along the transmission line. Namely, it is possible to set a starting point of VC-4 at an arbitrary point (3 byte unit) of the information portion in the frame.

Figure 4:
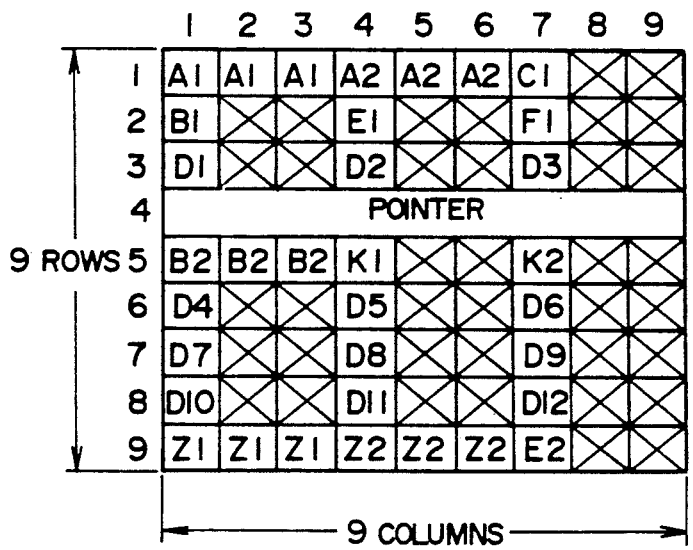
FIG. 4 is a diagram showing a construction of a section overhead in a frame.

FIG. 4 shows the detail of a SOH space. For example, A1 and A2 show synchronous patterns, and a starting point of a frame is detected by periodical detection of A1 and A2 (the frame period is constant). Further, since frame synchronous patterns A1 and A2 appear periodically, it is able to prevent the occurrence of erroneous out-of-synchronization due to a bit error generated in transmission by deciding a synchronizing error (synchronization protection) with non-detection of the synchronous pattern in a plurality of times after frame synchronization is established. An AU pointer (including a stuffing space) in the fourth row of SOH shows the starting point of the above-mentioned VC-4. In the information transmission portion in the frame, addresses are added in 3 byte unit from the fourth row and the tenth column, and the address of the starting point of VC-4 is contained in the AU pointer. Accordingly, it is possible to find out the starting point of VC-4 by looking at the AU pointer. When the relative position between the frame and VC-4 is changed (called stuffing), the seventh column through the twelfth column of the fourth row are used. There are two types of stuffing, positive (positive stuffing) and negative (negative stuffing), which are used properly so as to compensate for the difference in rate in accordance with the relative magnitude between a frame repeat rate determined by the clock frequency of the node and an information transmission rate. When the frame repeat rate of the node is higher, it is required to shift the head of VC-4 in a direction in which the head address increases with respect to the frame. Therefore, adjustment is made by blanking the fourth row and the tenth to twelfth columns (positive stuffing). Conversely, when the frame repeat frequency is lower than the information transmission rate, the head position of VC-4 is altered by transferring the information by using the fourth row and the seventh to ninth columns, too (negative stuffing). Namely, the difference between the frame repeat rate and the information transmission rate is adjusted by varying the size of the information transfer space in one frame. Generation of stuffing is informed to a downstream node by altering the pointer value. The deviation between the frame repeat rate and the information transmission rate is specified by an allowable stuffing frequency. Since stuffing can be performed only once in four frames according to the NNI standard, the deviation of three bytes is allowable for four frames. With this, it is required that the node clock frequency deviation of each node falls within ±309 ppm (=3/(2,430×4)) with respect to the information transmission rate. Further, in FIG. 4, D1–D12 show data spaces in 12 bytes called data communication channels and can be used for control information transmission among the nodes. In the present embodiment, the transition point information of the synchronizing clock is transmitted by utilizing these spaces. Bytes B1, B2, C1, E1, E2, F1, K1, K2, Z1 and Z2 are not required for explaining the present invention. Hence, the explanation thereof is omitted herein.

Returning now to FIG. 1, information transfer and clock distribution in a multimedia LAN will be described. In FIG. 1, only the nodes 2-8 to 2-11 in FIG. 2 are shown, and other nodes are omitted. Interface portions with apparatuses connected to nodes are shown with respect to the node 2-9 only. The node 2-8 is the master node, and supplies a common synchronizing clock (8 KHz) to other nodes. In FIG. 1, a path 12 shows a distribution path of a synchronizing clock, and a path 16 shows a transmission path for information. From a physical point of view, two paths are multiplexed, and transmission is performed using a single transmission path. In the multimedia LAN, an external clock 9 (8 KHz) supplied from the outside is distributed among all the nodes 2-8 ... 2-11 as a common synchronizing clock and is supplied to synchronous terminals connected to the nodes from respective nodes. Further, the information transfer rate is determined by outputting VC-4 synchronously with the external clock 9. Respective nodes 2-9 ... 2-11 transfer a common synchronizing clock information from the master node 2-8 to following nodes by means of relay units or repeaters 11-9 to 11-11. In each node, clock jitter generated at the time of clock transfer is reduced and a synchronizing clock is supplied to a synchronous apparatus 7-2 by means of a phase lock loop 13-9 (omitted with respect to other nodes). Further, respective nodes include oscillators 15-8 to 15-11 of the own station, determine frame periods with oscillated node clocks and send them to following nodes. Stuffing buffers 14-8 to 14-11 are used for absorption of the difference between a receiving frequency and a transmitting frequency. In case the information quantity stored in the buffer is varied by ±3 bytes and more from a central value of a buffer capacity, stuffing is executed and adjustment is made so that the information quantity applied to the ring becomes constant in the whole LAN. The synchronizing clock information arrives at the node almost periodically, but does not synchronize completely with the distributed synchronizing clock for a short time by the influence of stuffing. Therefore, this variation portion is controlled in a delay control circuit 16-9. In the master node 2-8, it is required to provide a function of controlling the delay so that the delay which makes a round in the ring becomes integer times as long as the frame period so that no information deficiency is produced in transferring operation. Usually, a buffer having a capacity of approximately one frame portion is prepared for that purpose separately from the stuffing buffer (for example, see JP-B-61-44426). This function is described along with a stuffing buffer 14-8 with reference to FIG. 1 for the sake of simplicity.

Figure 5:
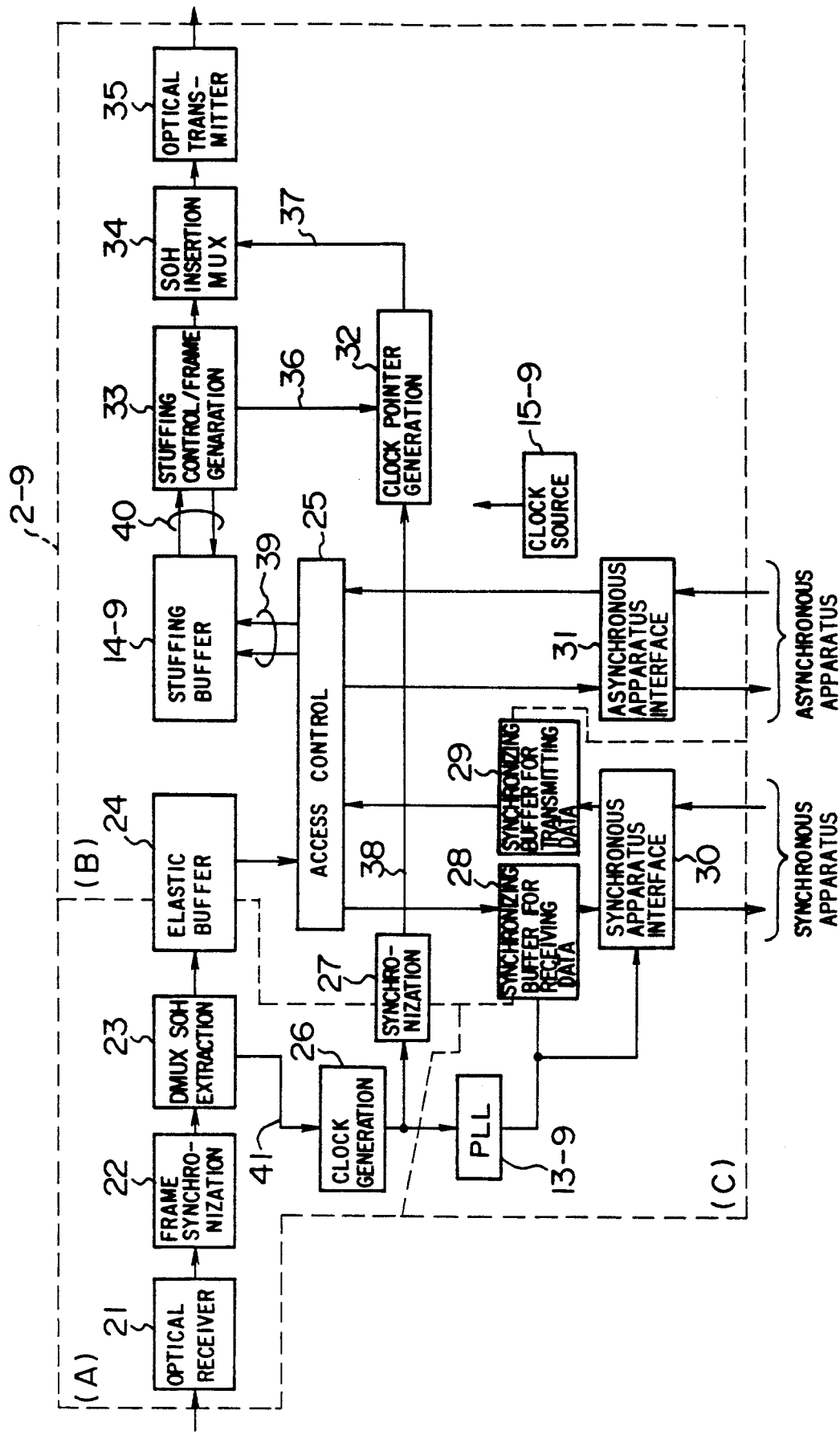
FIG. 5 is a block diagram showing a construction of a node constituting a LAN of the present invention.

FIG. 5 shows the construction of the node 2-9 in FIG. 1 in detail. Same numbers are affixed to those parts that are the same as components shown in FIG. 1. The node 2-9 is divided into three regions (A), (B) and (C) with one-dot chain lines depending on the type of used clock. The region (A) is operated by means of a received clock regenerated by an optical receiver 21 from received data. The region (B) is operated by means of a self-node clock supplied from a clock source 15-9 included in the node. The region (C) is operated by means of a synchronizing clock supplied from the master node. The transmission frequency is at 155.52 MHz, but the information is processed in one byte unit in the node. Therefore, the inside of the node is operated by a clock at the transmission frequency of ⅛ of 155.52 MHz, viz., 19.44 Mhz except a frame synchronous circuit 22. Accordingly, the oscillation frequency of the clock source 15-9 of the node is at 19.44 Mhz.

In the region (A), the received optical signal is converted into an electrical signal in the optical receiver 21, and a transmission clock (155.52 MHz), viz., a clock in an upstream node is extracted as the received clock. The extracted received clock is supplied to a frame synchronizing circuit 22, a multiplexing and demultiplexing/SOH extraction circuit 23 and a clock generation circuit 26 in the region (A). A starting point of frame is detected by the frame synchronization circuit 22. The multiplexing and demultiplexing/SOH extraction circuit 23 applies serial-parallel conversion to a signal at 155.52 Mb/s so as to convert into a byte unit of 19.44 MHz and also extracts the SOH portion of the received frame. An elastic buffer 24 in the region (B) is used for the purpose of absorbing a phase difference and a frequency difference between the received (transmission) clock and node clock. Among the received frame information, the portion of VC-4 is written in the elastic buffer 24 in byte unit. The information for showing the head of VC-4 is written at the same time. An access control circuit 25 monitors an empty status of the elastic buffer 24, and causes the VC-4 data to synchronize with the node clock when VC-4 data are in existence by reading the data using the node clock in byte unit. Since the information quantity of VC-4 is 261/270 of the information quantity in the frame (see FIG. 3), overflow of the elastic buffer 24 is not generated if the node clock frequency deviation is controlled within 3.8% (the frequency deviation is set within 308 ppm practically in order to prevent overflow of the stuffing buffer from occurring). Further, an access control circuit 25 performs relaying of information and information switching to and from synchronous and asynchronous apparatuses connected to the nodes. As a method of transferring synchronous and asynchronous information, a time division type system in which the inside of VC-4 is divided into two regions, one for transferring synchronous information and another for transferring asynchronous information, that is, VC-4 is divided into regions called slots and each slot is divided for synchronous information and asynchronous information (slotted ring) and so forth are adopted. Further, various techniques (see "The Data Ring Main: An Introduction to Local Area Network", written by David C. Flint, for instance) are well known as an access system to a ring of asynchronous information, both systems are applicable. The present invention relates principally to a construction of a physical layer. Hence, explanation of an access system to a ring is omitted herein. The synchronous apparatus is connected to the access control circuit 25 through a synchronous apparatus interface 30, a synchronizing buffer 28 for receiving data and a synchronizing buffer 29 for transmitting data (corresponding collectively to 16-9 shown in FIG. 5). The synchronous apparatus interface 30 terminates a protocol of the synchronous apparatus and converts it into an information format in the ring. Further, synchronizing buffers 28 and 29 for receiving and transmitting data are used for absorbing phase difference and instantaneous frequency difference between a common synchronizing clock and a node clock. The synchronous apparatus interface 30 belongs to the region (C) and is operated with the common synchronizing clock. On the other hand, the asynchronous apparatus is connected through an asynchronous apparatus interface 31, but it is not required to guarantee periodicity of information transfer. Therefore, the asynchronous interface 31 is operated with a node clock in a similar manner as the access control unit 25.

Information is sent out from the node 2-9 in a specified frame period with the node clock. Therefore, the information quantity which VC-4 can transfer is different in general from the information quantity of VC-4 which has been input to the node 2-9. A stuffing function is used in order to absorb the difference in the information quantity. The output of the access control circuit 25 is written into a stuffing buffer 14-9 in byte unit. A stuffing control and frame generating circuit 33 generates a frame which has been explained with reference to FIG. 3 and FIG. 4 and reads the information in byte unit from the stuffing buffer 14-9 at the time of outgoing of VC-4 and sends out the information. With the stuffing operation, the information quantity in the stuffing buffer 14-9 is monitored, and execution is performed when a predetermined threshold is exceeded. For example, when the threshold is set to ½ of the stuffing buffer capacity ±3 bytes, negative stuffing is performed when the capacity of information accumulated in the stuffing buffer exceeds ½ of the stuffing buffer capacity +3 bytes, and the information quantity which can be transferred in one frame is increased for adjustment. Further, when the capacity of information accumulated in the stuffing buffer is lower than ½ of the stuffing buffer capacity −3 bytes, positive stuffing is performed, and the information quantity which can be transferred in one frame is reduced for adjustment. As described previously, it is required to control the frequency deviation of the node clock to fall within ±308 ppm in order not to generate overflow and underflow of the stuffing buffer 14-9. In a SOH insertion and multiplex (MUX) circuit 34, SOH information is inserted and information in byte unit is multiplexed so as to obtain information at 155.52 Mb/s. The node clock (19.44 MHz) is multiplied by light by using a PLL and the like so as to become a clock at 155.52 MHz, which is supplied to a multiplexing circuit 34 and an optical transmitter 35 (connection omitted in the figure). The information applied with series conversion is converted into an optical signal in an optical transmitter 35 and sent out to an optical fiber which is a transmission line.

Further, the synchronizing clock information existing in the SOH which is extracted in the SOH extraction circuit 23 is sent to the clock generation circuit 26 through a signal line 41, and a synchronizing clock is generated. The generated synchronizing clock is supplied to the synchronizing buffer 28 for receiving data and the synchronous apparatus interface 30 after jitter is suppressed in a PLL 13-9. Further, the generated synchronizing clock is synchronized with the node clock in a synchronization circuit 27 (details will be explained with reference to an embodiment shown in FIG. 8). In a clock pointer generation circuit 32, transition points of the synchronizing clock synchronized with the node clock are counted from the starting point of frame, and the counted value is added to the SOH insertion circuit 34 as transition point information of the synchronizing clock. The starting point of frame is known with a frame head signal 36 from the stuffing control/frame generation circuit 33. In the SOH insertion circuit 34, the transition point information of the synchronizing clock is inserted into a data communication channel of SOH, and is sent out to the following node as synchronizing clock information.

Figure 6:
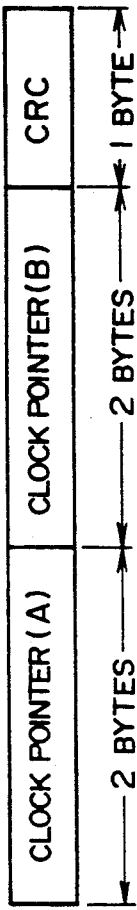
FIG. 6 is a signal construction diagram of a clock pointer used in an embodiment of the present invention.
Figure 7:
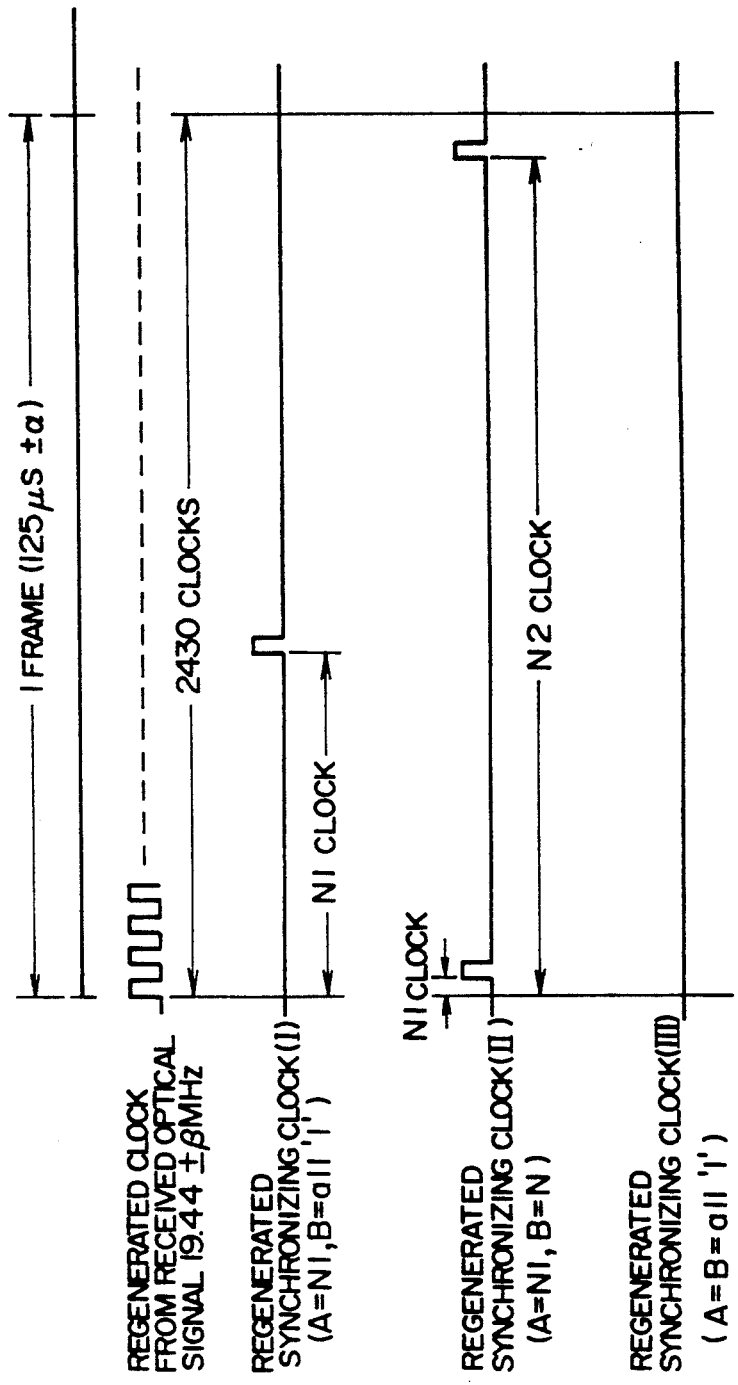
FIG. 7 is a pattern diagram of synchronizing clocks regenerated in an embodiment of the present invention.

The distribution method of the synchronizing clock will be described in detail hereinafter. FIG. 6 shows a transfer format of transition point information of a synchronizing clock. A region in 5 bytes in the whole is used. For example, transfer is made using D1–D5 of the data communication channels of the SONET frame explained with reference to FIG. 4. Taking a case where there are two transition points of the clock in one frame into consideration, two clock pointers showing the transition point of the synchronizing clock are transferred. The last one byte is a CRC (cyclic redundancy check) code for error check. FIG. 7 shows the relationship between the transfer format and the regenerated clock. The synchronizing clock (8 KHz) is sampled with the node clock (19.44±$\beta$MHz) of a previous node, and the transition point information is transferred in the format shown in FIG. 6. Since the period (125 $\mu s\pm\alpha$) of the common synchronizing clock and the frame period generated by a previous node are different from each other, there are a case in which the transition point is nonexistent (case (III) shown in FIG. 7), a case in which there is one transition point (case (I)) and a case in which there are two transition points (case (II)) in one frame. In each node, the frequency of a transmission clock (155.52 MHz) regenerated from a received optical signal is divided by eight so as to regenerate a node clock of a previous node, and a common sycnhronizing clock is regenerated using the node clock and the transition point information of the synchronizing clock. 2,430 pcs. of node clocks are included in one frame, which are counted from the starting point of frame, and the pointer (FIG. 6) shows the clock in which the synchronizing clock has varied. Thus, it is possible to express the pointers (A) and (B) in 12 bits, but 2 bytes are used for each pointer in order to delimit information in byte unit. The pointer (A) shows the first synchronizing clock transition point in the frame, and the pointer (B) shows the second transition point. When there is not relevant transition point, all bits are set to "1". In the case (I) of FIG. 7, there is one transition point in the frame, which is shown with the pointer (A). In the receiving node, the regenerated node clocks are counted from the starting point of the received frame, and a common synchronizing clock is regenerated by generating a pulse when N1 (value of pointer (A)) pcs. are counted. In the case (II), there are two transition points, and pulses are generated each time when N1 and N2 clocks are counted. The case (III) shows a case in which there is no transition point in the frame. All bits are set to "1" in both pointers (A) and (B). When a CRC error is generated in the pointer, received pointer information is abolished, and a transition point is determined by counting 2,430 clocks from the last transition point of the regenerated synchronizing clock. Since it is usually possible to control the deviation between the node clock and the synchronizing clock small, it is possible with the above to control the influence by a transmission error small even if the transmission error is generated.

Figure 8:
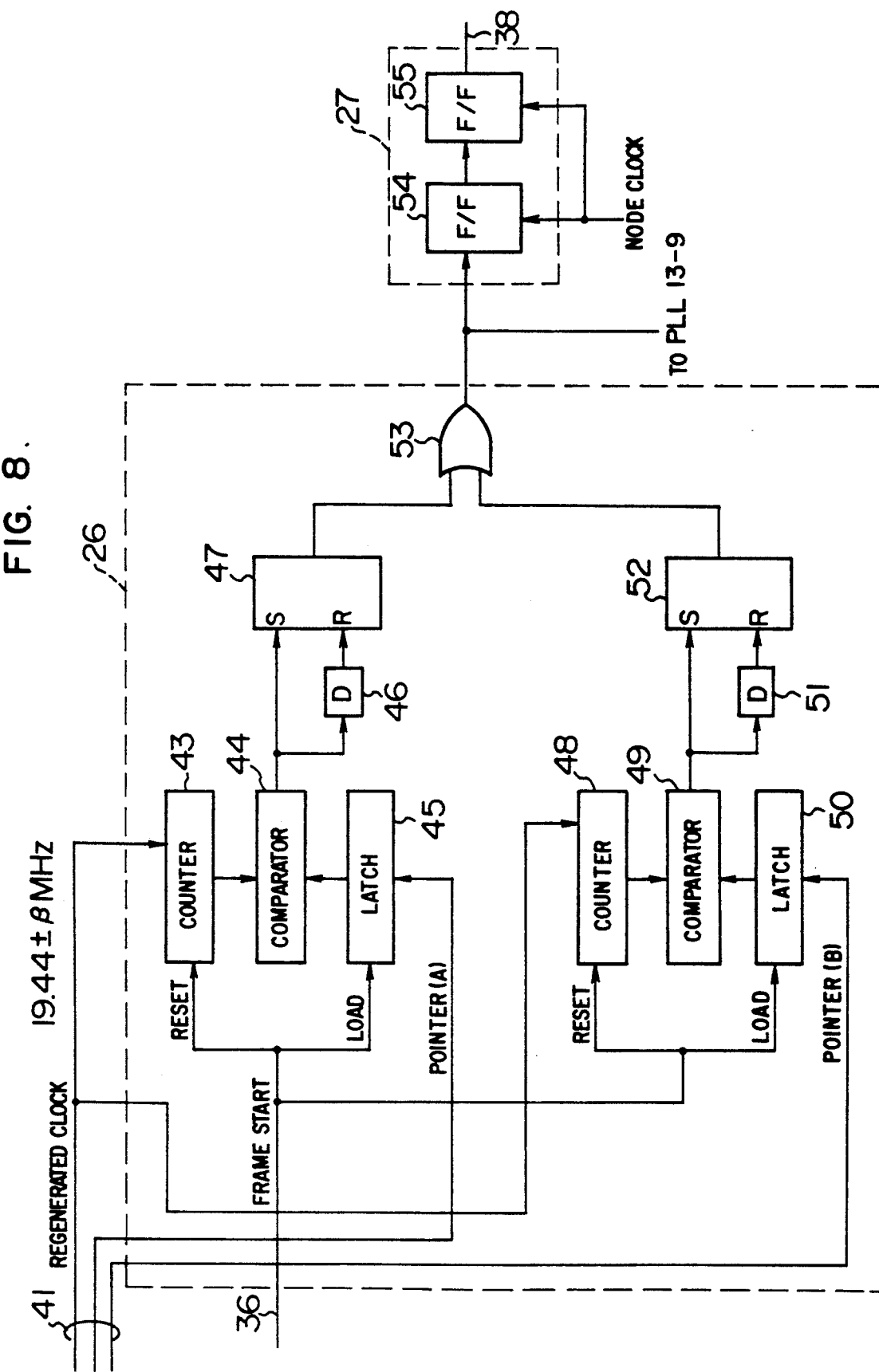
FIG. 8 is a block diagram of a synchronizing clock generating circuit in an embodiment of the present invention.

FIG. 8 shows details of the clock generation circuit 26 and the synchronization circuit 27 of FIG. 5. For the purpose of simplifying explanation, a check processing circuit of CRC errors is omitted. The frequency of a transmission clock regenerated in the optical receiver 21 is divided by eight by the multiplexing and demultiplexing/SOH extraction circuit 23, and sent to the clock extraction circuit 26 as a regenerated clock (19.44±$\beta$ MHz) through the signal line 41 together with extracted clock pointers (A) and (B). The received two pointers (A) and (B) are used for generating transition point information of a synchronizing clock in a next frame. Accordingly, subordinate twelve bits of the pointers (A) and (B) are loaded on latches 45 and 50 by means of a frame starting signal 36. On the other hand, two twelve bit counters 43 and 48 are reset by means of the frame starting signal 36 and start counting up. When the value of the counter 43 (or 48) and the value of the latch 45 (or 50) are in agreement with each other, an output of a comparator 44 (or 49) reaches "H", and sets a set/reset type flip-flop 47 (or 52). The flip-flops 47 and 52 are reset by signals which are delayed in delay elements 46 and 51, respectively. Therefore, when the counter value agrees with the pointer value, a pulse is generated at that point. Since the maximal counter value is 2,430, the pointer and the counter are not in agreement with each other when all the bits of the pointer are at "1", and no clock is generated. Since the output of the flip-flop 47 shows the transition point by the pointer (A), and the output of the flip-flop 52 shows the transition point by the pointer (B), it is possible to regenerate a synchronizing clock by obtaining an OR of two outputs with an OR gate 53. Since the output of the clock generation circuit 26 is in synchronism with the regenerated node clock of a previous node, it is impossible to use the output as it is in a clock pointer generation circuit 32 which is operated with a self-node clock. Therefore, the output is synchronized with the self-node clock in a clock synchronization circuit 27. The synchronization circuit 27 is composed of cascase connection in two stages of two edge-trigger flip-flops 54 and 55. The self-node clock is supplied to two flip-flops 54 and 55. Since the input of the flip-flop 54 and the self-node clock are asynchronous with each other, the output becomes unstable sometimes. However, the output is synchronized with the self-node clock by taking the output of the flip-flop 54 into the flip-flop 55 when the unstable state is dissolved. An output 38 of the clock synchronization circuit 27 is added to the clock pointer generation circuit 32.

Figure 9:
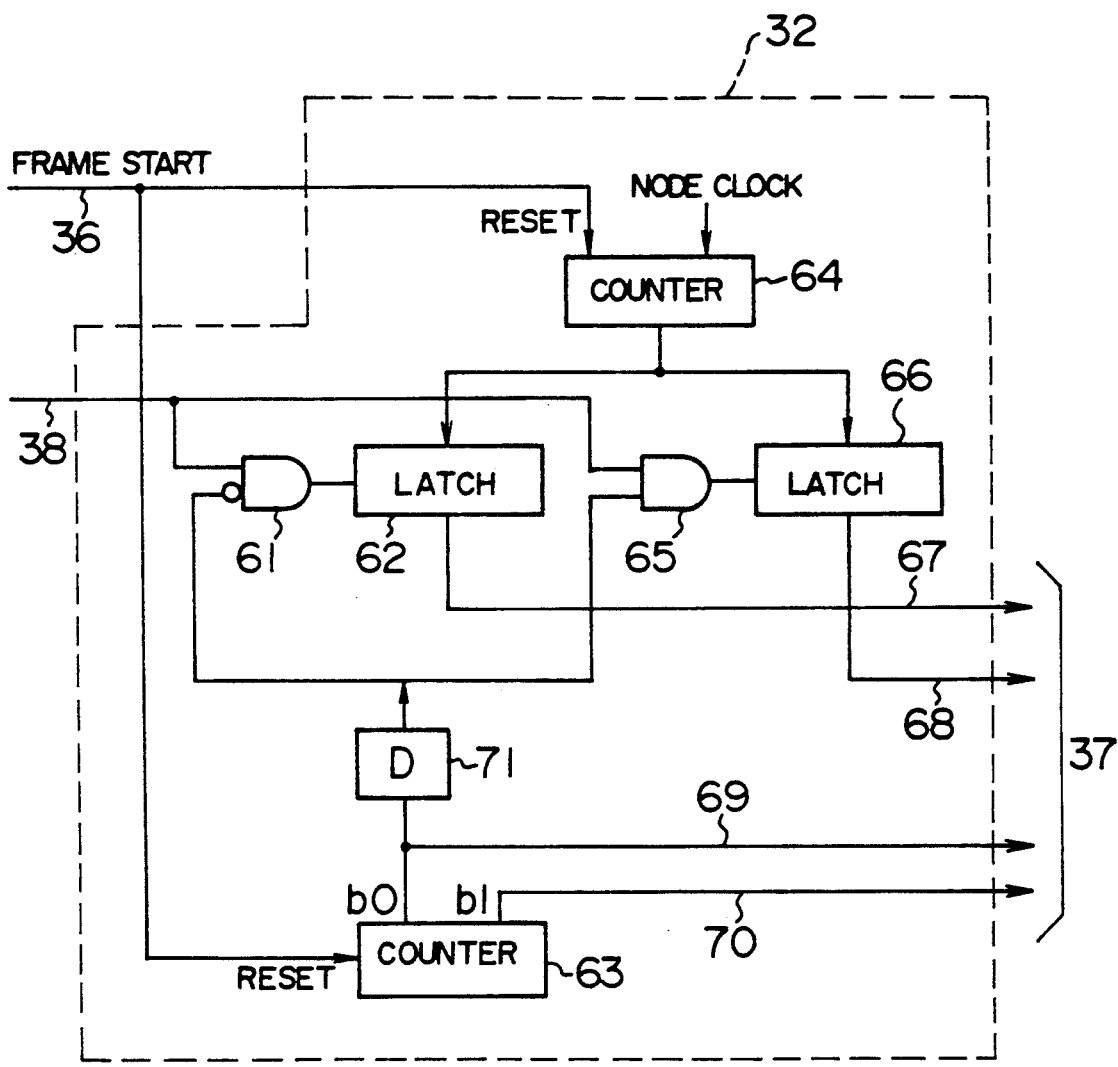
FIG. 9 is a block diagram of a clock pointer generating circuit in an embodiment of the present invention.

FIG. 9 shows the detail of the clock pointer generation circuit 32. The number of self-node clocks from the starting point of frame in a self-node to the transition point of the synchronized synchronizing clock 38 is counted by a 12-bit counter 64. A 2-bit counter 63 counts the number of synchronizing clock transition points in one frame. Both counters 64 and 63 are reset by a frame starting signal 36. Further, all the bits of latches 62 and 66 are set to "1" by the frame starting signal 36. With this, "1" is output for all in case there is no clock transition point in the frame. The bit b0 output of the counter 63 shows that the transition point of the clock is either the first (b0=1) or the second (b0=0) in the frame. The output of an AND gate 61 is varied at the first transition point, and the value of the counter 64 at that time is taken into the latch 62. Further, the output of an AND circuit 65 is varied at the second transition point and the counter value at the transition point is taken into the latch 66. The output of the counter 63 is varied at the transition point of the synchronizing clock, and a delay circuit 71 is inserted in order to prevent the pulse width of the outputs of the AND gates 61 and 65 from narrowing. The number of synchronizing clock transition points and the positions of the transition points in one frame are found when looking at outputs 69 and 70 of the counter 63 and outputs 67 and 68 of the latches 62 and 66. Thus, a clock pointer, viz., transition point information of the synchronizing clock which is sent to a node on the next stage is generated using the above findings.

Figure 10:
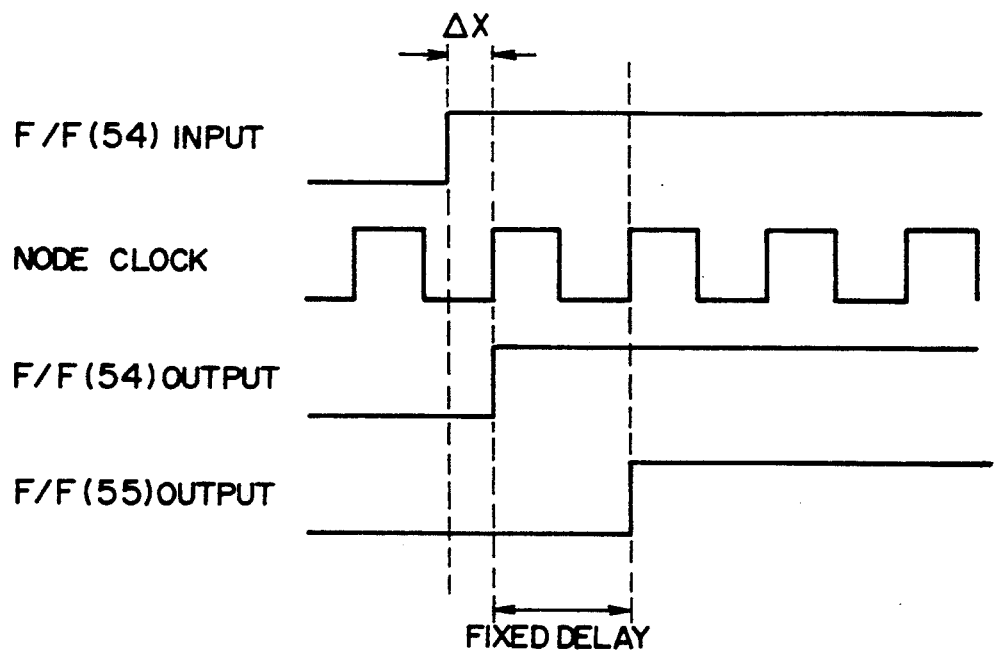
FIG. 10 is a waveform diagram for explaining a jitter generating mechanism in case of synchronizing clock transfer.

Next, clock jitter in the above-mentioned synchronizing clock distribution will be described. The synchronizing clock is repeated in succession in respective nodes, but jitter is generated when the synchronization circuit 27 of each node performs synchronization. FIG. 10 shows a generating mechanism of the jitter. As it is understood from the figure, the transition point of the generated synchronizing clock (input of F/F (54)) and the transition point of the synchronizing clock after synchronization (output of F/F (55)) are shifted from each other by one clock period $+\Delta x$. Since node clock frequencies of respective nodes are different from one another, $\Delta x$ is varied time-wise so as to form a jitter. Since $\Delta x$ is varied from 0 to 50 ns (1/19.44 MHz) at the maximum, the maximum value of the jitter reaches 50 ns $\times$ number of nodes in the worst case. However, this jitter is suppressed by the PLL. Since the jitter attenuation quantity of the PLL is in proportion to the jitter frequency in general, it is possible to attenuate high frequency jitter to such a level that the jitter causes no problem in the PLL. Accordingly, the jitter in a low frequency becomes an issue. In order to evaluate the jitter quantity in case the number of connected nodes is increased, a case of the number of nodes at 128 is evaluated for instance. Now, a case in which the jitters of 50 ns at the maximum in respective nodes are added to become jitter of a single frequency at the 128th node is considered as the worst case. The maximum amplitude of the jitter becomes 25 ns $\times$ 127 transfers = 3.3 $\mu$s. Since the jitter is usually specified at 10 Hz and above (the jitter at less than 10 Hz is called "wander"), the jitter at 10 Hz is considered. A case in which the jitter added in the worst case shows a sinusoidal wave at 10 Hz is considered. In this case, all the jitter power is concentrated to 10 Hz. When it is assumed that the jitter attenuation quantity at 10 Hz in the PLL is 30 dB (a value which is able to be realized easily with existing techniques by using a voltage controlled crystal oscillator), the jitter of the PLL output becomes approximately 100 ns which is an allowable value (for example, a user/network interface at 1.5 Mb/s is specified in TTC standard JT-1431, but 3.2 $\mu$s is specified in the frequency range from 10 Hz to 120 Hz as a jitter quantity to be allowed by the terminal). It is also possible to control the jitter quantity by altering the jitter attenuation quantity by varying parameters of the PLL and by varying the frequency of sampling the synchronizing clock. Since sampling is made at 19.44 MHz in the embodiment, the jitter generated during relaying operation was 50 ns at the maximum, but it is possible to reduce the jitter quantity by increasing the sampling frequency because the generated jitter is reduced in inverse proportion to the sampling frequency.

In the next place, stuffing for absorbing the difference between the node clock frequency and the information transfer rate in each node will be described in detail. In the embodiment shown in FIG. 1, the information transfer rate is specified by an external clock 9. Namely, when synchronization between the starting point of VC-4 and the external clock 9 is off, stuffing is performed to have both of them in agreement with each other in order to cause the starting position of VC-4 generated by the master node 2-8 to synchronize with the external clock 9. On the other hand, stuffing is performed in general nodes 2-9 to 2-11 except the master node 2-8 in order to send out the information quantity which is sent from a previous node without excess and deficiency with the self-node clock. Accordingly, stuffing algorithms are different between the master node 2-8 and general nodes 2-9 to 2-11.

Figure 11:
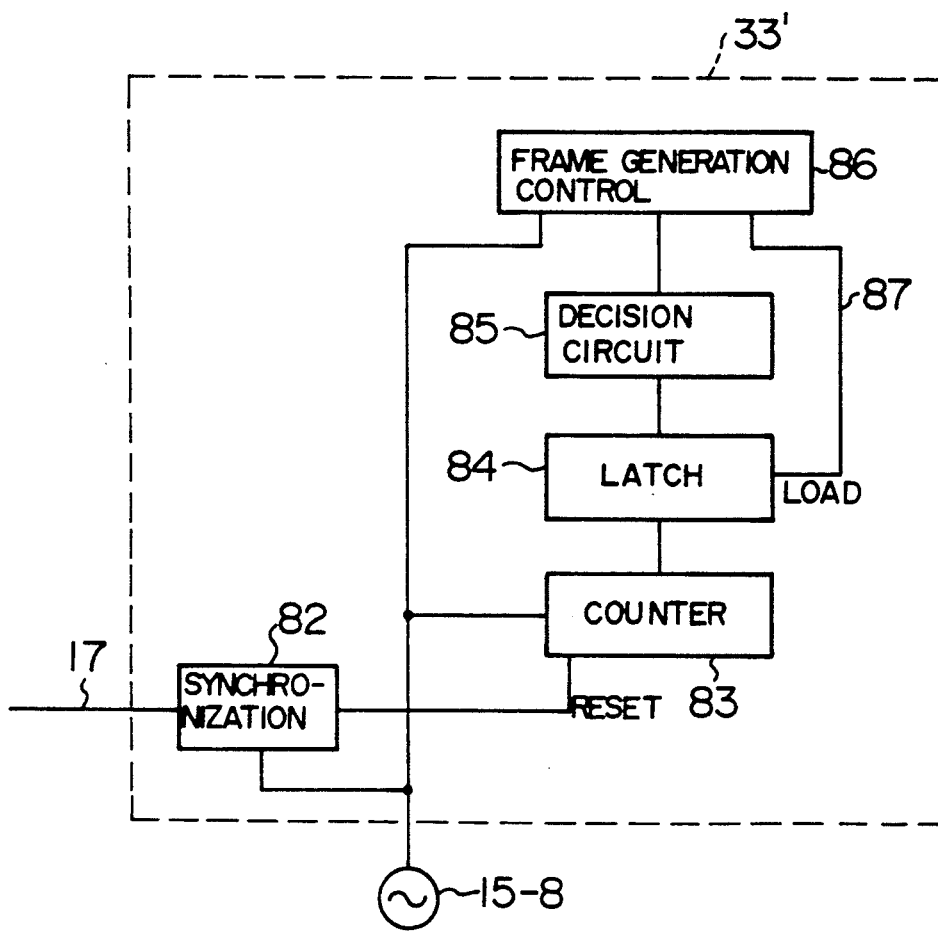
FIG. 11 and FIG. 12 both show block diagrams of a stuffing portion in a master node in an embodiment of the present invention.

FIG. 11 shows a composition for realizing stuffing in the master node 2-8. Namely, a construction 33' of a circuit corresponding to a stuffing control/frame generation circuit 33 of the general node 2-9 is shown. Stuffing in the master node is executed so that the external clock and the starting point of VC-4 generated by the master node are compared with each other and both phases fall within a fixed value. With this, it is possible to make the rate of information outputted from the master node agree with the external clock. In FIG. 11, a clock input 17 is an output obtained by applying the external clock 9 of FIG. 1 to the PLL 10 and reducing the jitter. This clock input 17 is synchronized with a node clock from a clock source 15-8 in a synchronization circuit 82 (the construction thereof is the same as 27 shown in FIG. 8), and is compared with a starting point signal 87 of VC-4 which is generated by a frame generation control circuit 86. A counter 83 is reset by the synchronized external clock and counted up with the node clock. Therefore, the number of node clocks from the startup of the synchronized external clock is counted. It is possible to know the phase difference between the external clock and the starting point of VC-4 by loading the value of the counter 83 onto a latch 84 by a VC-4 starting point signal 87 which is outputted from the frame generation control circuit 86. Since the phase difference is distributed from 0 to 2,429 (number of node clocks in one frame - 1), it is possible to control so that the starting point of VC-4 falls within three clocks from the synchronized external clock by performing negative stuffing when the phase difference is, for example, a value from 4 to 1,215 and positive stuffing is a value from 1,215 to 2,426. Decision of the phase difference is made by means of a decision circuit 85, and the result is sent to the frame generation control circuit 86, thus executing stuffing.

Figure 12:
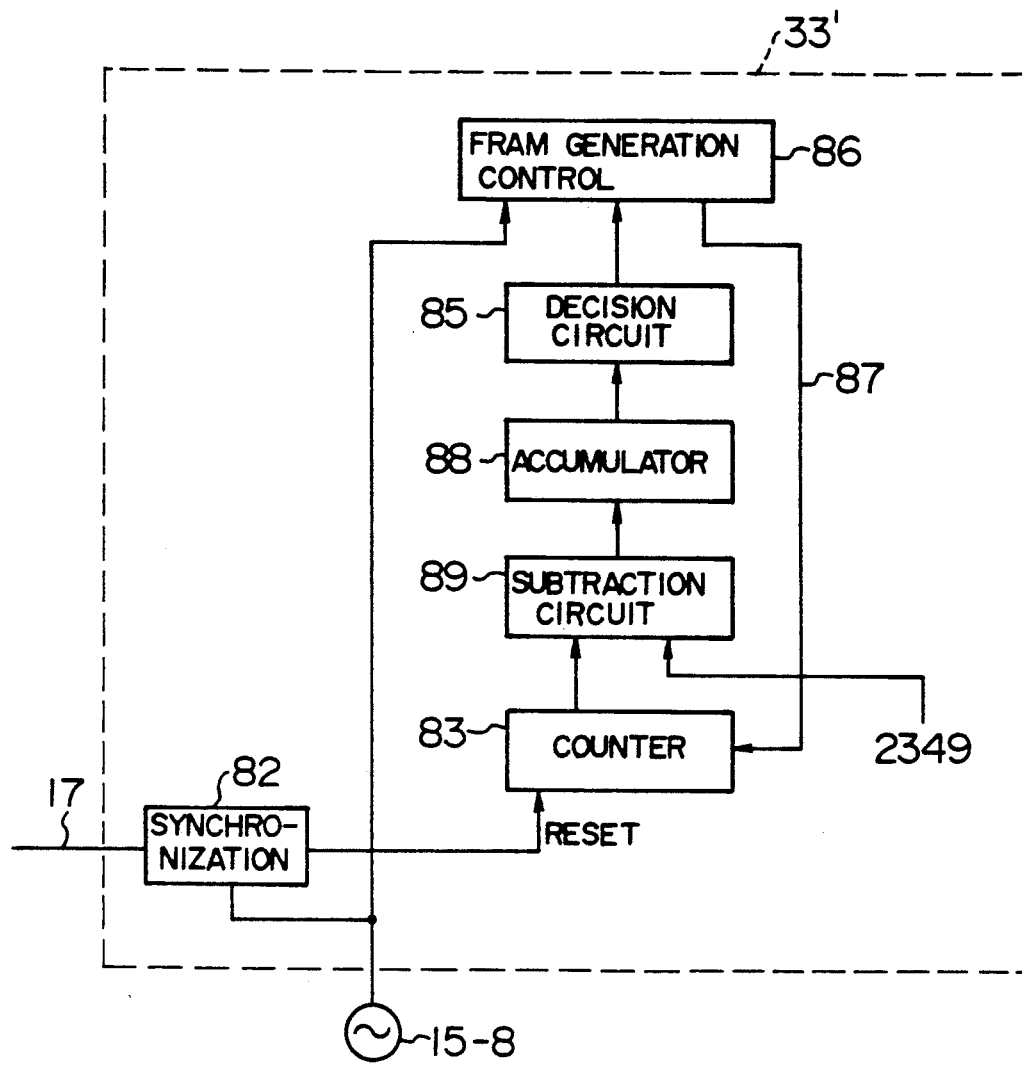

FIG. 12 shows a construction of another embodiment of a stuffing control portion in the master node. In the present embodiment, it is controlled so that the difference between the number of bytes of VC-4 which are actually sent out during one period of the synchronized external clock and the number of bytes (261 $\times$ 9 = 2,349) which are to be sent originally becomes a fixed value and less. In FIG. 12, those parts that are the same as FIG. 11 are affixed with same numbers, and explanation thereof is omitted. Since the counter 83 is reset by a signal obtained by synchronizing the external clock 17, it is possible to count the VC-4 output signal supplied by the frame generation control circuit 86 for one period portion of a signal obtained by synchronizing the external clock. At the time when counting is terminated, the difference between 23 and 49 is obtained by means of a subtraction circuit 89 and accumulated with an accumulator 88. It is decided by the decision circuit 85 that the accumulated value exceeds +3 bytes, and the result is sent to the frame generation circuit 86, thereby to control stuffing in the master node.

In case the external clock 9 cannot be utilized, the frequency of the clock output from the clock source 15-8 of the master node 2-8 is demultiplied to generate a signal of 8 KHz, which is used as a synchronizing clock source. In this case, stuffing is not generated because the node clock and the synchronizing clock are in synchronism with each other in the master node.

Figure 13:
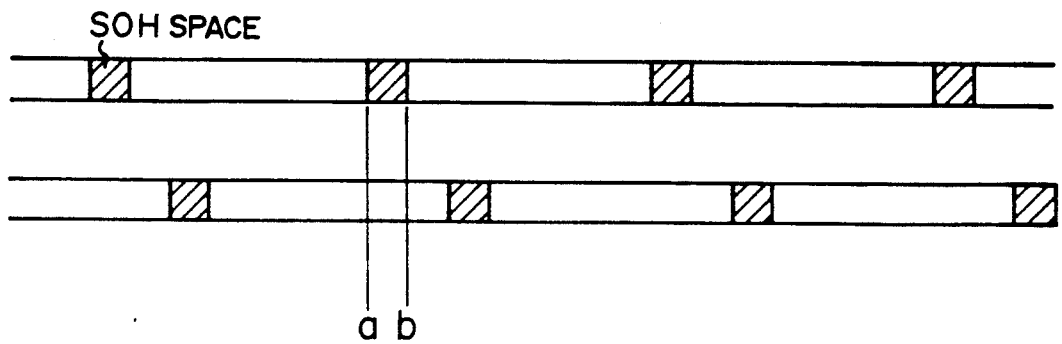
FIG. 13 is a distribution diagram of SOH spaces at stuffing buffer input/output.

Next, a stuffing control portion in a general node will be explained in detail. FIG. 13 shows information which is inputted and outputted in and from the stuffing buffer 14-9 shown in FIG. 5. Hatched portions in the figure show SOH spaces. The frame structure is shown in FIG. 3, but the frame is transmitted from left to right and from top to bottom successively. Therefore, the SOH space including 9 bytes appears periodically as shown in FIG. 13. Further, since frame periods and starting points of frame of reception and transmission are independent, respectively, the SOH spaces of transmission and reception are not in synchronism with each other as shown in FIG. 13, and the phase difference is varied time-wise. Accordingly, such a problem arises that when the node determines whether or not stuffing is to be performed based on an information quantity in the stuffing buffer 14-9. For example, since the input is the SOH space in 9 bytes during the period from a point a to a point b in FIG. 13, information is not written in the stuffing buffer, but the output is read out of the stuffing buffer 14-9 because the output is an information space. Thus, the information quantity in the stuffing buffer at the point b is reduced by 9 bytes as compared with the point a. In such a manner, the information quantity in the stuffing buffer 14-9 depends on the time of observation and is varied by ±9 bytes. In order to avoid such a problem, a system is adopted, in which the position in the buffer where information has been read is stored when information in one frame is read out of the stuffing buffer 14-9 in byte unit and it is decided whether stuffing is executed or not by a mean value of one frame portion of the information quantity in the stuffing buffer 14-9. According to this system, stuffing is performed correctly because reduction of the information quantity in the stuffing buffer due to writing in the SOH space and increase of the information quantity in the stuffing buffer due to writing of SOH are offset each other by averaging even under a status such as shown in FIG. 13.

Figure 14:
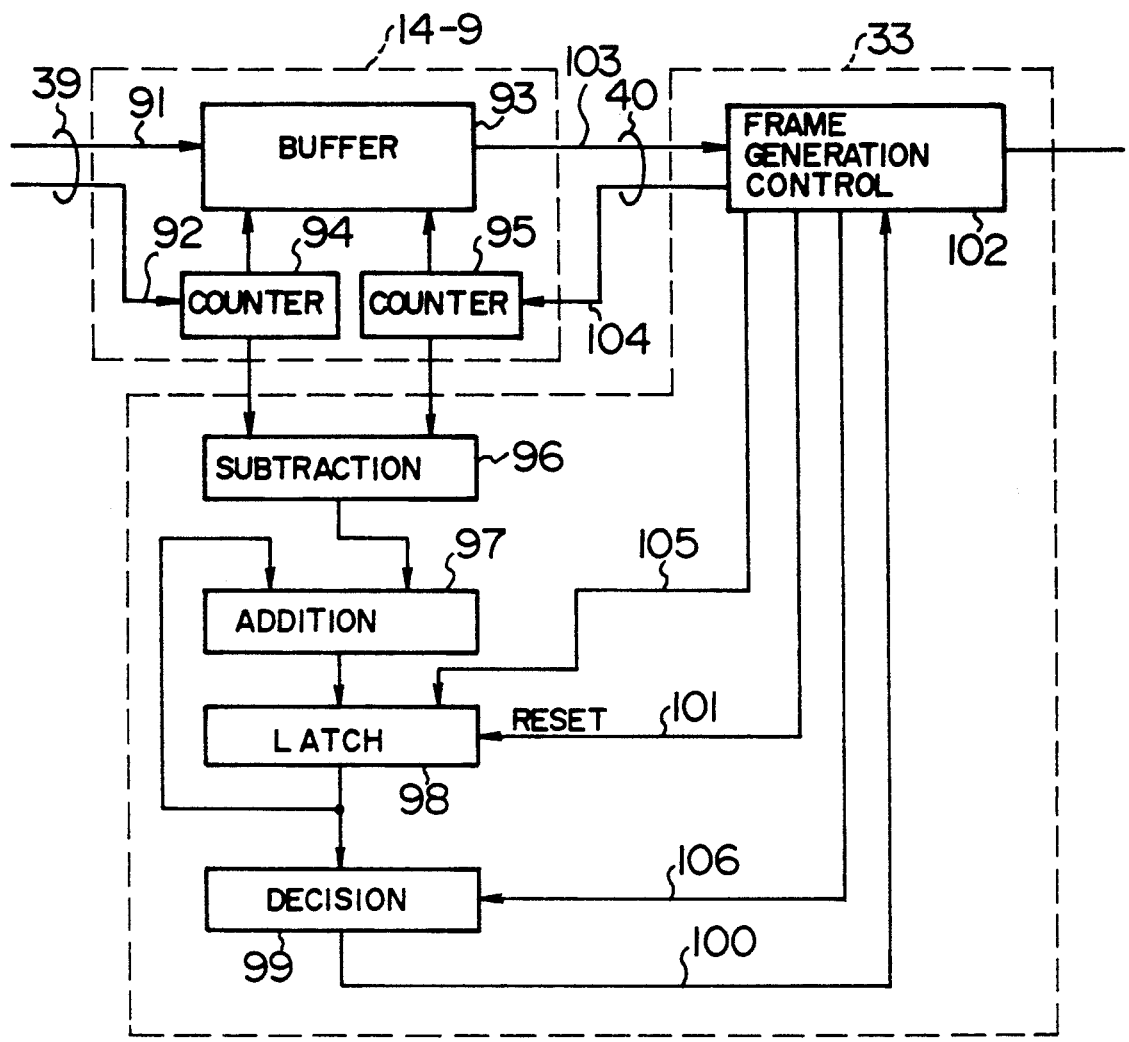
FIG. 14 is a block diagram of a stuffing control portion in a general node.
Figure 15:
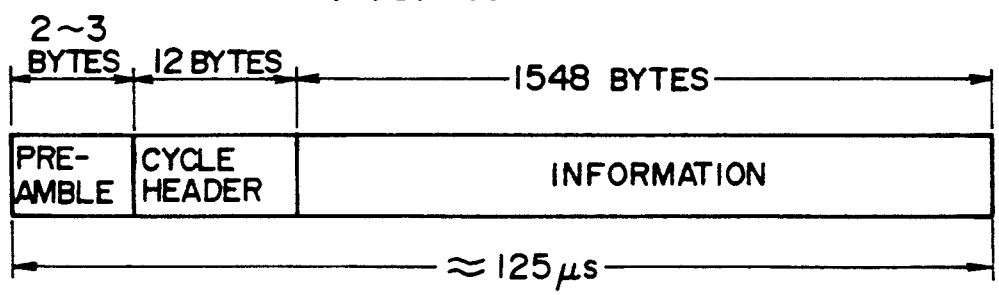
FIG. 15 is a frame format diagram of FDD-I which has been heretofore known.

FIG. 14 shows a construction of an embodiment of the stuffing buffer 14-9 and the stuffing control and frame generation circuit 33 shown in FIG. 5 for explaining the above-mentioned algorithm. The stuffing buffer 14-9 is composed of a buffer memory 93 which stores information in byte unit and counters 94 and 95 which control write and read addresses, respectively. The counter 94 is counted up by a write signal 92 every time information is written from an access control circuit 25 through a line 39, and the counter 95 is counted by a read signal 104 every time information is read by the stuffing control and frame generation circuit 33. The counter value is reset when it reaches the maximum capacity of the buffer 93. Thus, it is possible to know the information quantity in the buffer 93 by obtaining the difference between both counters 94 and 95 by a subtraction circuit 96. The results thereof are accumulated for one frame portion using an adder 97 and a latch 98. In order to obtain accumulation for one frame portion, the latch 98 is reset by a frame starting signal 101, and supplies a clock 105 only when information (excluding the SOH space) is read out. A decision circuit 99 decides whether stuffing is to be performed in a next frame from the accumulated value of the information quantity in the buffer 93 and the number of transfer bytes in one frame at the point when accumulation of one frame portion is completed. Namely, the accumulated value determines stuffing or no stuffing with the number of VC-4 transfer bytes x (the maximum capacity of the buffer 93/2±3 bytes) as a boundary. The number of transfer bytes in one frame has only three types, that is, 2,346 bytes (positive stuffing), 2,349 bytes (no stuffing) and 2,352 bytes (negative stuffing) depending on the existence of stuffing in that frame, and is informed to the decision circuit 99 from a frame generation control circuit 102 through a signal line 106. The result of decision is transferred to a frame generation control circuit 102 through a signal line 100, thus executing stuffing.

An embodiment of the present invention has been described above, but it is clear that the present invention is not limited to the above-mentioned embodiment. Explanation has been made so far with respect to a single frame. A plurality of frames are applied practically with time division multiplexing for transmission in many cases, but a case of transmission applied with time division multiplexing is included in the present invention as a matter of course.

For example, when four frames are transmitted with time division multiplexing being applied thereto (information transmission rate is 155.52×4 Mbps), it may be arranged so as to perform stuffing for four frames at the same time instead of performing stuffing for each frame (155.52 Mbps).

According to the present invention, it is possible to compose a multimedia LAN which has no jitter accumulation to a transmission clock and is able to control the jitter of the synchronizing clock to such a level that has no problem. Furthermore, it is possible to use a fixed length frame which is standardized internationally, and to realize a LAN which is durable against transmission errors and in which the physical transmission rate and the logical transmission are equal to each other.

We claim:

1. An independent clocking local area network in which a plurality of nodes are connected through transmission lines, wherein each of said nodes comprises:
   means for extracting a received clock signal;
   a clock source which generates an independent node clock signal;
   frame generating means for generating a fixed length frame with an oscillation frequency of said independent node clock signal as a reference;
   means for regenerating a synchronizing clock signal which has been sent out by an upstream node using transition point information provided in a specific space of a received frame;

synchronization means for synchronizing the regenerated synchronizing clock signal with the independent node clock signal; and means for detecting a transition point of the synchronizing clock signal synchronized by said synchronization means and setting said detected transition point in a specific space of the fixed length frame generated by said frame generation means as the transition point information of the synchronized synchronizing clock signal.

2. An independent clocking local area network according to claim 1, wherein said means for detecting and setting the transition point in each of said nodes further comprises:

means for counting the time from a position of said generated fixed length frame to the transition point of the synchronizing clock signal synchronized with said independent node clock signal; and means for inserting a value obtained as a result of counting into said specific space of said generated fixed length frame.

3. An independent clocking local area network according to claim 1, wherein said generated fixed length frame is composed of a SONET frame, and the specific space in said generated fixed length frame which transfers the transition point information of said synchronizing clock signal is a data communication channel.

4. A local area network according to claim 1, wherein at least one node of said plurality of nodes is a master node for feeding said synchronizing clock signal as a master synchronizing clock signal to remaining nodes, and said master node comprises means for using an external clock signal or said independent node clock signal as said master synchronizing clock signal, and setting a transition point of said master synchronizing clock signal in a specific space of said generated fixed length frame and means for adjusting an information quantity carried in said generated fixed length frame so that an information quantity specified by said master synchronizing clock signal is transferred to the next node.

5. A node for a local area network, comprising:

receiving means for receiving information of a fixed length frame;

means for extracting a received clock signal;

a clock source which generates an independent node clock signal;

frame generation means for generating a fixed length frame with an oscillation frequency of said independent node clock signal as a reference;

regenerating means for reading transition point information of a synchronizing clock signal out of a specific space of said fixed length frame received by said receiving means and for regenerating said synchronizing clock signal which has been sent from an upstream node using said received clock signal;

synchronization means for synchronizing said regenerated synchronizing clock signal with said independent node clock signal generated by said clock source;

means for detecting a transition point of said synchronized regenerated synchronizing clock signal in said received frame; and means for inserting the transition point of said synchronized regenerated synchronizing clock signal into a specific space in the generated fixed length frame.

6. An independent clocking local area network composed of a plurality of nodes and transmission lines connecting said plurality of nodes, wherein each of said nodes comprises:

means for extracting a received clock signal;

a clock source which generates an independent node clock signal;

storage means for storing received information temporarily;

means for generating a fixed length frame with an oscillation frequency of said independent node clock signal as a reference; and information outgoing quantity control means for increasing information quantity which is carried by each frame when information quantity stored in said storage means becomes more than a predetermined first reference value, and decreasing information quantity which is carried by each frame when information quantity stored in said storage means becomes less than a predetermined second reference value;

wherein each of said nodes comprise means for transferring a synchronizing clock signal to be fed to synchronous terminals by setting a transition point of said synchronizing clock signal in a specific space of said generated fixed length frame.

7. An independent clocking local area network according to claim 6, wherein said transfer means includes means for counting the time from a position of said generated fixed length frame to a transition point of said synchronizing clock signal, and means for inserting a value of the counting result into said specific space.

8. An independent clocking local area network according to claim 6, wherein said plurality of nodes are connected in a ring form.

9. An independent clocking local area network according to claim 6, wherein said generated fixed length frame is composed of a SONET frame, and said specific space in said generated fixed length frame which transfers the transition point of said synchronizing clock signal is a data communication channel.

10. A local area network according to claim 6, wherein at least one node of said plurality of nodes is a master node for feeding said synchronizing clock signal as a master synchronizing clock signal to remaining nodes, and said master node comprises means for using an external clock signal or said independent node clock signal as the master synchronizing clock signal and setting a transition point of said master synchronizing clock signal in said specific space of said generated fixed length frame and means for adjusting an information quantity carried in said generated fixed length frame so that an information quantity specified by said master synchronizing clock signal is transferred to the next node.

11. An independent clocking local area network composed of a plurality of nodes and transmission lines connecting said plurality of nodes, wherein each of said nodes comprises:

means for extracting a received clock signal;

a clock source which generates an independent node clock signal;

storage means for storing received information temporarily;

means for generating a fixed length frame with an oscillation frequency of said independent node clock signal as a reference; and information outgoing quantity control means for increasing information quantity which is carried by each frame when information quantity stored in said storage means becomes more than a predetermined first reference value, and decreasing information quantity which is carried by each frame when information quantity stored in said storage means becomes less than a predetermined second reference value;

wherein said information outgoing quantity control means includes a means for increasing or decreasing the information quantity in each single frame in accordance with a result of accumulating information indicating the quantity of information stored in said storage means over the duration of at least one frame or a result of averaging information indicating the quantity of information stored in said storage means over the duration of at least one frame;

wherein each of said nodes comprise means for transferring a synchronizing clock signal to be fed to synchronous terminals by setting a transition point of said synchronizing clock signal in a specific space of said generated fixed length frame.

12. An independent clocking local area network according to claim 11, wherein said generated fixed length frame is composed of a SONET frame, and said specific space in said generated fixed length frame which transfers the transition point of said synchronizing clock signal is a data communication channel.

13. A local area network according to claim 11, wherein at least one node of said plurality of nodes is a master node for feeding said synchronizing clock signal as a master synchronizing clock signal to remaining nodes, and said master node comprises means for using an external clock signal or said independent node clock signal as the master synchronizing clock signal and setting a transition point of said master synchronizing clock signal in said specific space of said generated fixed length frame and means for adjusting an information quantity carried in said generated fixed length frame so that an information quantity specified by said master synchronizing clock signal is transferred to the next node.

14. An independent clocking local area network according to claim 11, wherein said plurality of nodes are connected in a ring form.

15. A local area network according to claim 8, wherein at least one node of said plurality of nodes is a master node for feeding said synchronizing clock signal as a master synchronizing clock signal to remaining nodes, and said master node comprises means for using an external clock signal or said independent node clock signal as the master synchronizing clock signal and setting a transition point of said master synchronizing clock signal in said specific space of said generated fixed length frame and means for adjusting an information quantity carried in said generated fixed length frame so that an information quantity specified by said master synchronizing clock signal is transferred to the next node.

16. An independent clocking local area network according to claim 11, wherein said generated fixed length frame is composed of a SONET frame, and said specific space in said generated fixed length frame which transfers the transition point of said synchronizing clock signal is a data communication channel.

17. A local area network according to claim 9, wherein at least one node of said plurality of nodes is a master node for feeding said synchronizing clock signal as a master synchronizing clock signal to remaining nodes, and said master node comprises means for using an external clock signal or said independent node clock signal as the master synchronizing clock signal and setting a transition point of said master synchronizing clock signal in said specific space of said generated fixed length frame and means for adjusting an information quantity carried in said generated fixed length frame so that an information quantity specified by said master synchronizing clock signal is transferred to the next node.

18. A local area network according to claim 6, wherein at least one node of said plurality of nodes is a master node for feeding said synchronizing clock signal as a master synchronizing clock signal to remaining nodes, and said master node comprises means for using an external clock signal or said independent node clock signal as the master synchronizing clock signal and setting a transition point of said master synchronizing clock signal in said specific space of said generated fixed length frame and means for adjusting an information quantity carried in said generated fixed length frame so that an information quantity specified by said master synchronizing clock signal is transferred to the next node.

* * * * *